United States Patent [19]

Dawn et al.

[11] Patent Number: 5,384,083
[45] Date of Patent: Jan. 24, 1995

[54] METHOD FOR FORMING A GLOVE ATTACHMENT

[75] Inventors: Frederic S. Dawn, Houston; Walter W. Guy, Friendswood; Joseph J. Kosmo, Seabrook, all of Tex.; Arthur P. Drennan, Westford; Richard P. Tschirch, Westwood, both of Mass.

[73] Assignee: The United States of America as represented by the Administrator of the National Aeronautics & Space Administration, Washington, D.C.

[21] Appl. No.: 929,556

[22] Filed: Aug. 14, 1992

[51] Int. Cl.⁶ .............. B29C 39/12; B29C 67/14
[52] U.S. Cl. .................... 264/130; 264/135; 264/137; 264/257
[58] Field of Search .......... 264/257, 324, 241, 137, 264/135, 130; 249/155, 156

[56] References Cited

U.S. PATENT DOCUMENTS

| | | | |
|---|---|---|---|
| D. 205,925 | 10/1966 | Whitcraft | D3/11 |
| 2,581,249 | 1/1952 | Ganz | 25/156 |
| 2,943,969 | 7/1960 | Boyer et al. | 264/257 |
| 3,148,235 | 9/1964 | Velonis et al. | 264/301 |
| 3,268,355 | 8/1966 | Brodeur, Jr. | 264/257 |
| 3,607,600 | 9/1971 | Schreter et al. | 264/257 |
| 3,649,967 | 3/1972 | Millman | 2/161 A |
| 3,879,764 | 4/1975 | Weber-Liel | 2/167 |
| 3,887,750 | 6/1976 | Duckett et al. | 264/257 |
| 4,089,069 | 5/1978 | Vistins | 2/161 R |
| 4,270,228 | 6/1981 | Gaiser | 2/158 |
| 4,359,783 | 11/1982 | Andrews | 2/161 R |
| 4,495,238 | 1/1985 | Adilletta | 428/215 |
| 4,514,460 | 4/1985 | Johnson | 428/245 |
| 4,515,851 | 5/1985 | Johnson | 428/246 |
| 4,555,813 | 12/1985 | Johnson | 2/161 R |
| 4,670,330 | 6/1987 | Ishiwata | 428/290 |
| 4,676,853 | 6/1987 | Lerma | 156/87 |
| 4,923,741 | 5/1990 | Kosmo et al. | 428/252 |
| 4,994,225 | 2/1991 | Davis | 264/257 |
| 5,192,482 | 3/1993 | Brambach | 264/257 |

FOREIGN PATENT DOCUMENTS

| | | | |
|---|---|---|---|
| 670894 | 1/1939 | Germany | 249/156 |
| 454889 | 2/1950 | Italy | 249/156 |

*Primary Examiner*—Jay H. Woo
*Assistant Examiner*—Duane S. Smith
*Attorney, Agent, or Firm*—James M. Cate; Edward K. Fein; Guy M. Miller

[57] ABSTRACT

A method for forming a glove attachment principally for the palm of an astronaut glove to enhance the gripping area of the palm without detracting from the flexibility and utility of the glove. The attachment is a composite construction formed from a layer of silicone rubber having an outer surface with a friction configuration and an another layer of silicone rubber in which a meta-aramid mesh fabric is embedded prior to curing. The method of construction involves the use of a mold with a friction configuration surface. A first layer of silicone rubber or sealant is disposed in the mold and allowed to set for an hour. A second layer of silicone rubber or sealant is layered over the first layer and leveled. A meta-aramid mesh fabric is embedded into the second layer and the composite is permitted to cure. When cured, a configured area of the composite construction is glued or stitched to the palm area of the glove.

6 Claims, 2 Drawing Sheets

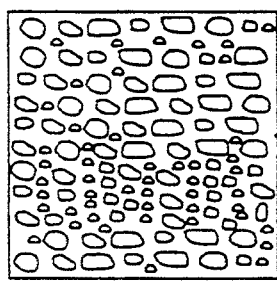
FIG. 4
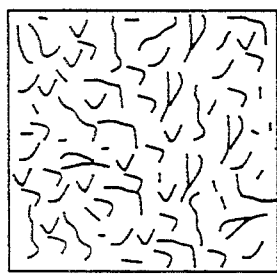
FIG. 5
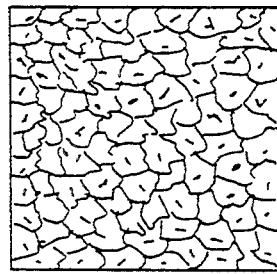
FIG. 6
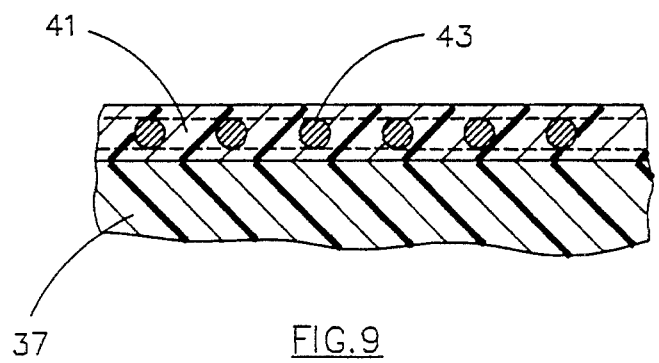
FIG. 9
FIG. 8
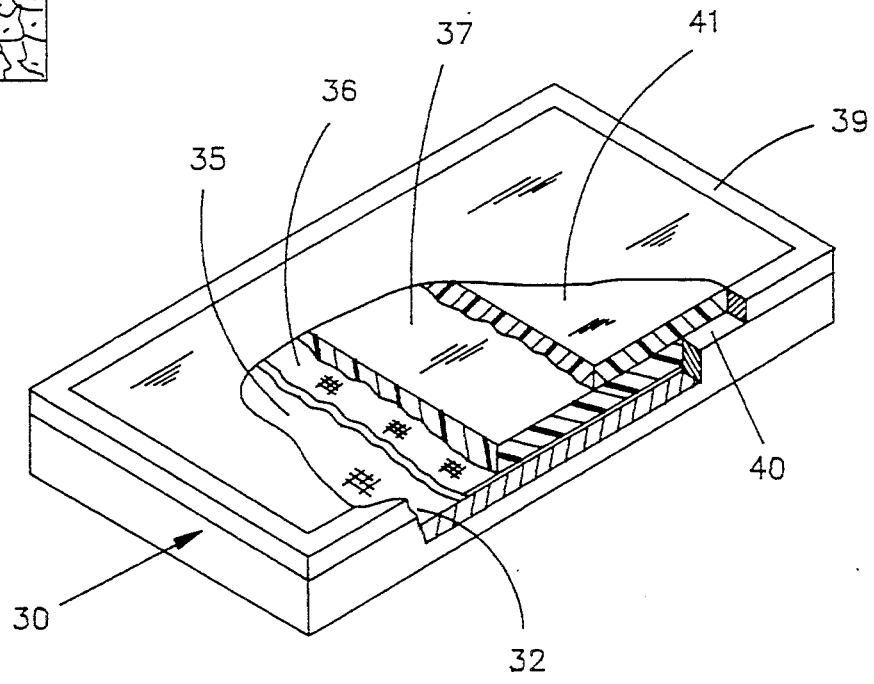
FIG. 7

METHOD FOR FORMING A GLOVE ATTACHMENT

ORIGIN OF THE INVENTION

This invention described herein was made in the performance of work under a NASA contract and is subject to the provisions of Section 305 of the National Aeronautics and Space Act of 1958, Public Law 85-568 (72 Stat. 435; 42 U.S.C 2457).

FIELD OF THE INVENTION

This invention relates to astronaut gloves and more particularly to a palm attachment for a glove construction for providing improved friction or gripping surface that is functional over a wide temperature range and is lightweight, durable, flexible and has a minimal effect upon dexterity of the glove in use.

BACKGROUND OF THE INVENTION

Astronauts utilize gloves in space operations. A background paper on glove development for aerospace applications is "Development of Higher Operating Pressure Extra Vehicular Space Suit and Glove Assemblies", SAE Technical Paper 881102, 18th Intersociety Conference on Environmental System, San Francisco, Calif. Jul. 11–13, 1988, authored by Joseph J. Kosmo, John Bassick and Phil Spampinato. Glove designs and configurations have evolved as described in the above identified paper and there is a continuing effort in search of a glove construction which will have a minimal effect upon dexterity, is lightweight, durable and flexible and will operate over a wide temperature range. In addition to operational gloves there are also thermal micrometeoroid garment covergloves for extravehicular activity operations.

As noted in the above paper it is desirable to enhance the grasp capability of the palm area of a glove used in space operations. Palm grasp capability in a glove is necessary since performance in a space operation centers about the ability of a crew member to grasp and manipulate tools or objects. For one reason or another in any number of glove constructions, it is not possible to enhance the palm gripping surface of a glove simply by molding a friction type surface in the palm area of a glove. Consequently, such space type gloves and other similar types of gloves require some type of friction or gripping surface in the palm area.

PRIOR ART PATENTS

U.S. Pat. No. 205,925 illustrates a single layer glove with a gripping surface on its front surface having randomly spaced three pointed "stars". The "stars" appear to be applied as discrete points as contrasted to a continuous coating.

U.S. Pat. No. 2,581,249 discloses a ceramic dipping glove mold which incorporates rough surfaces and smooth surfaces in the palm side of the glove material. The mold is used to produce a single layer glove which is seamless and with the rough pattern incorporated into the outer glove surface.

U.S. Pat. No. 3,148,235 relates to a method for making seamless gloves by a dipping process using plastisols, lattices or solutions. Particulate matter in the dip solution are larger than the wall thickness of the glove so that a pattern is produced in the single layer of the glove and roughens the exterior and interior surfaces. The texture outer surface minimizes blocking of the gloves in a package.

U.S. Pat. No. 3,649,967 relates to a non-slip golfer's glove where portions of the glove which are a woven breathable fabric are coated with a resilient plastic non-slip protuberances arranged in rows and columns with breathing spaces between protuberances.

U.S. Pat. No. 3,879,764 discloses a composite glove made of an absorbent textile fabric and a polyurethane sheet bonded to the textile fabric.

U.S. Pat. No. 4,089,069 discloses a work glove construction with a wrinkle finish. The glove is formed by a base member with a textile fabric. On the palm side of the glove is a fibrous non-woven textile or bat which is needled to the base fabric. The glove is then coated with an elastomeric resin and cured. A long nap is provided on the outer surface. The loose naps on the surface of the palm leave a coarse randomly wrinkled finish. Strike through is not required.

U.S. Pat. No. 4,270,228 relates to use of reticulated foam as the cover on the palm side of a glove for gripping wet surfaces. A layer of foam can be attached to an underlying glove.

U.S. Pat. No. 4,359,783 is similar to U.S. Pat. No. 4,089,069 and discloses a laminate in the palm area which is comprised of a non-woven fibrous web of meta-aramid containing a staple fiber and a woven or knitted web where the staple fibers join the webs. The laminated web is coated with an elastomeric compound and the coated web can be used to manufacture gloves.

U.S. Pat. No. 4,514,460 is a continuation-in-part of U.S. Pat. No. 4,515,851 in which a laminated glove which is formed from a foam applied to a cotton fabric and dried. The foam can then be secured to a glove surface (see also U.S. Pat. No. 4,555,813 which is a divisional application).

U.S. Pat. No. 4,670,330 relates to gloves made from a fabric impregnated with polyurethane resin.

Technical Literature

SAE Technical Paper 881102, 18th Intersociety Conference on Environmental System, San Francisco, Calif., Jul. 11–13, 1988 discusses the development of Higher Operating Pressure Extravehicular Space-Suit Glove Assemblies. Various glove systems are discussed.

SUMMARY OF THE INVENTION

The present invention is in an attachment principally for the palm of a glove to enhance the gripping area of the palm without detracting from the flexibility and utility of the glove. The attachment is a composite construction formed from a layer of silicone rubber having an outer surface with a friction configuration and an another layer of silicone rubber in which a meta-aramid mesh fabric is embedded prior to curing.

The method of construction involves the use of a mold with a friction configuration surface. A first layer of silicone rubber or sealant is disposed in the mold and allowed to set for an hour. A second layer of silicone rubber or sealant is layered over the first layer and leveled. A meta-aramid mesh fabric is embedded into the second layer and the composite is permitted to cure. When cured, a configured area of the composite construction is glued or stitched to the palm area of a glove.

DESCRIPTION OF THE DRAWINGS

In the drawings:

FIGS. 4, 5, and 6 are surface configuration which are suitable for friction or gripping surfaces;

FIG. 7 is a view in partial cross-section for illustrating the process steps of the present invention;

FIG. 8 is an enlarged cross-section view illustrating structural relationships during the process;

FIG. 9 is an enlarged cross-section view illustrating the composite structure at the completion of the process.

DESCRIPTION OF THE INVENTION

Figure 1:
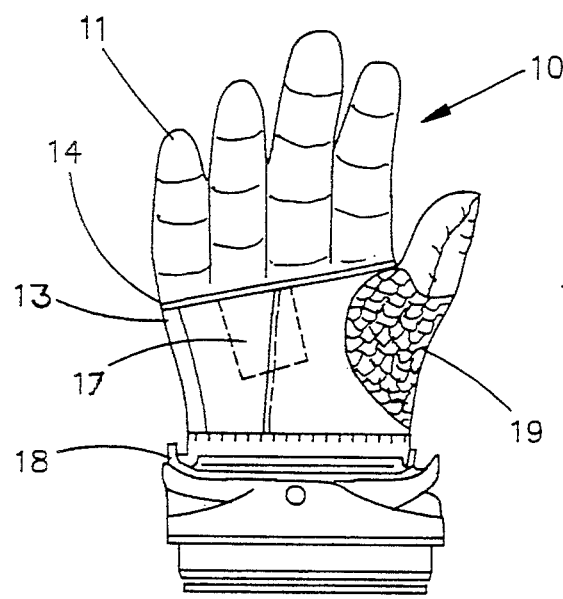
FIGS. 1 and 2 are front and side views of one type of prior art space suit gloves on which the invention can be used.
Figure 2:
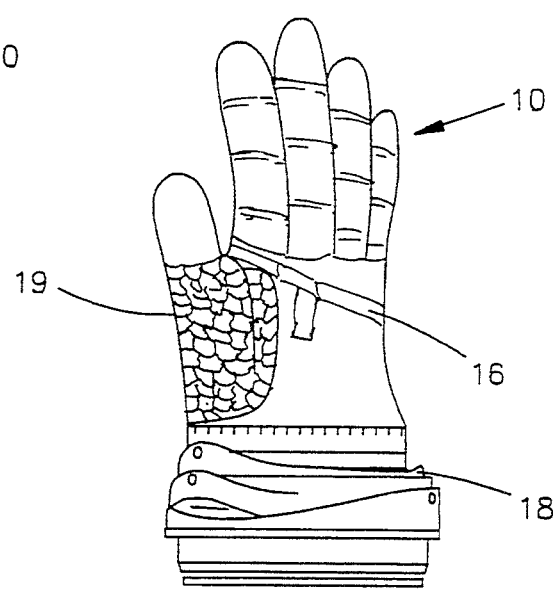

As shown in FIGS. 1 and 2, a typical glove configuration 10 for aerospace operations includes a finger construction 11 based on a tucked fabric pattern design which customarily and anatomically simulates the crew member's fingers. In the palm area 13 a rigid stainless steel palm bar 14 with an adjustable strap 16 provides contour to the upper palm surface and to act as a break line for metacarpal flexion. The bar 14 is custom formed to the curvature of the crew member's hand and is adjustable by means of a strap and buckle arrangement for easy donning. To provide conformal palm control in the concave portion of the hand, a segmented palm assembly 17 is utilized. The segmented palm assembly 17 is fabricated from hard titanium epoxy segments with angled sides and contoured top and bottom surfaces which do not flex during motion. The segments are attached to a para-aramid fabric and create a specific conforming contour to the hand surface. The glove's thumb metacarpal joint 19 provides a multi-axis joint with increased comfort and reduced bulk. A high strength cord is used to fabricate a link net and a polytetrafluorethylen fabric liner is used to reduce cord frictional torque. The link net covers only the lower thumb metacarpal surface portion. The wrist joint 18 utilizes a rolling convolute wrist design. In this type of glove, pressure from outside the glove, such as a force from grasping an object, is transmitted to the hand and thus can provide tactile feedback. This type of pressure glove lacks a specific gripping surface in the palm area.

Figure 3:
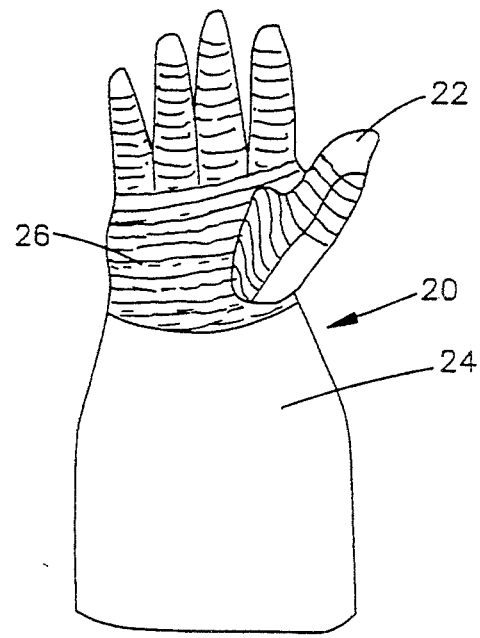
FIG. 3 is a front view of another type of space suit glove on which the invention can be used.

In FIG. 3, a thermal micrometeoroid garment cover glove 20, another prior art glove, is illustrated. Glove 20 consists of a varying multi-layered construction where the various components have different constructions. In the finger area 22 the fingertip design uses a dipped room temperature vulcanizing (RTV) silicone procedure to eliminate the thickness seam and cap interfaces while enhancing tactility and providing thermal protection. The back of the finger uses teflon fabric for abrasion protection and aluminized polyester film for thermal protection. The gauntlet 24 also uses aluminized mylar film as thermal protection and teflon fabric for abrasion resistance and durability. In the palm area 26 an RTV silicone coating is used to enhance tactility. However, glove 20 does not provide a friction gripping surface.

In the present invention, a fabric is pretreated to form a composite fabric and then affixed by stitching or bonding to the palm side of a glove to provide a lightweight, durable, flexible, frictional palm surface on the gloves.

Referring now to FIG. 7, a hollow mold or container 30 has a bottom surface 32 with a surface pattern. As shown in FIG. 4, the surface pattern can be an irregular dimpled surface 32a, a rough texture pattern 32b (FIG. 5) or a light texture pattern 32c (FIG. 6) or any other desired friction surface pattern.

In preparing a composite fabric, according to the present invention, the bottom surface 32 of the mold (see FIG. 7) is rubbed with a mold release wax, such as Costa Wax No. 2, and then brushed with a stiff brush to remove the excess wax and to assure a clean pattern. The mold release wax surface 35 which remains is then buffed with clean cheese cloth. After coating with the mold release wax, a release agent 36 such as a dry spray fluorocarbon is applied over the surface of the mold release wax surface 35. The release agent 36 may be, for example, Miller Stevenson Product MS-122. The mold 30 is then filled level with silicone rubber compound 37 such as "GE sealant 157" until the compound 37 is level to its top surface 40. This provides a substantially uniform thickness. The compound 37 is allowed to "set" for about an hour at ambient temperature to derive a low viscosity, gel state consistency. A thickness shim 39 is then located on the top surface 40 to define additional sides of the mold. The shim thickness of the shim 39 is adjusted to provide the desired thickness for an over-layer of material. A shim with a thickness of 18 to 20 mils gives a preferred final total composite thickness (including the fabric thickness of about 36 to 37 mils). A second coating or over-layer 41 of "GE sealant 157" is then applied in the cavity defined by the shim 39 and is leveled by use of a blade or rod to match the upper surface of the shims.

A precut piece of meta-aramid mesh fabric 43 (see FIG. 8) is next placed over the over-layer coating 41. The mesh fabric 43 has a thickness less than the thickness of the over-layer 41. The size of the mesh fabric will be a factor in the strength of the composite structure, i.e. a small mesh will afford greater overall strength than a larger mesh fabric.

A piece of clear polyester film is then placed on the exposed back of the mesh fabric 43 and the polyester film is rubbed with a pad of cheese cloth to force the fabric 43 into the overlayer 41 until the strike through or extrusion of the overlayer 41 through the mesh fabric 43 extends over the surface of the mesh fabric 43 and the mesh fabric 43 is embedded in the overlayer 41.

The polyester film is then stripped off and the surface over the back of the mesh fabric 43 is rubbed with cheese cloth to smooth the outer surface.

The composite is then allowed to cure overnight at ambient temperatures and then stripped from the mold 30.

Figure 10:
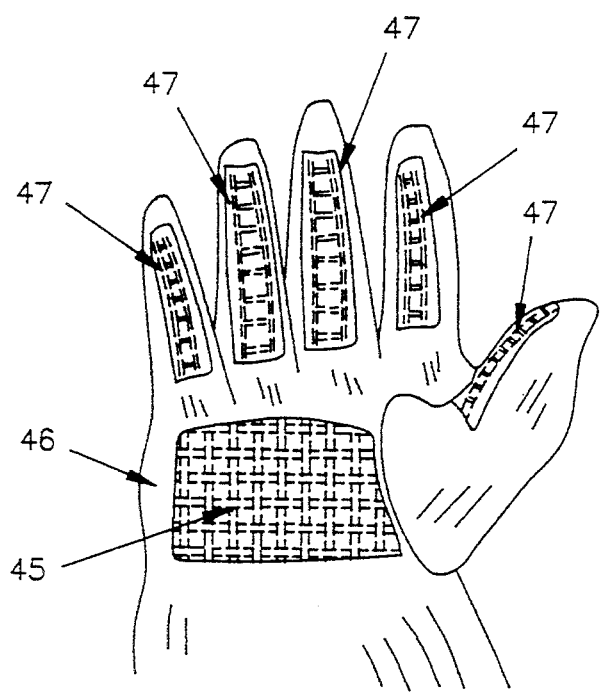
FIG. 10 is a view of a glove and digit application of an attachment made in accord with the present invention.

The composite may have an outline configuration suitable for attachment to the palm of a glove by a suitable glue or by stitching. The outline configuration can also be formed by cutting or triming to a desired configuration. While the preferred application is to a glove palm as shown by the attachment 45 to a glove palm 46 in FIG. 10, the application can be to fingers or a thumb, as shown by attachments 47, if desired.

The meta-aramid fabric is obtainable from Stern & Stern Textiles, Inc., Style HT92-54. A silicone rubber such as one component GE silicone sealant "157", or two component GE RTV "630", "664" or "700" silicone rubber can be used. The silicone rubber can be cured with a curing agent such as Beta one curing agent (General Electric Company, Silicone Products Division) and the two component silicone rubber compound SX-6507, parts A and B (obtainable from Castelle, Inc.).

Utilizing the above process, the level of adhesion between the coating and the fabric increases with the degree of strike through or embedding of the fabric in the over-layer 41. If an additional back coat of silicone sealant is applied, the peel strength of the composite can be further increased.

The GE sealant "157" is a one component RTV silicone and tends to cure quite rapidly. It develops a surface skin on contact with moisture from the air. The alternative two component RTV silicone rubbers have a much longer open time or working life at room temperatures. With either of these systems it is not necessary to set the initial coating. If desired, the two component types from the build-up to the desired thickness in a single coating pass. Primers such as GE "SS 4044" or "SS 4179" may be applied to the fabric if necessary to improve coating adhesion.

It will be apparent to those skilled in the art that various changes may be made in the invention without departing from the spirit and scope thereof and therefore the invention is not limited by that which is enclosed in the drawings and specifications but only as indicated in the appended claims.

We claim:

1. A method of constructing a thin, lightweight, flexible, durable composite structure that is functional over a wide range of temperatures in a space environment for attachment to glove areas for enhancing frictional characteristics including the steps of:

constructing a mold with a bottom surface arranged in a frictional pattern, applying a release agent to the mold for casting;

disposing a first liquid silicone rubber compound which can set at ambient temperatures in the mold to form a first layer of material of selected uniform thickness of approximately 18 to 20 mils;

permitting the first liquid silicone rubber to set to a gel state, disposing a second liquid silicone rubber compound which can set at ambient temperatures over the first liquid silicone rubber compound and forming the second liquid silicone rubber compound to a selected uniform thickness of approximately 18 to 20 mils;

overlaying the second liquid silicone rubber compound with a meta-aramid mesh fabric having a thickness less than the thickness of said second liquid silicone rubber compound;

forcing the fabric into said second liquid silicone rubber compound to extrude said second liquid silicone rubber compound through the fabric mesh;

smoothing off the surface of said second liquid silicone rubber compound whereby the thickness of the first and second silicone rubber layers is between 36 and 40 mils; and curing said first and second silicone rubber compounds.

2. The method as set forth in claim 1 wherein the mold is prepared by first applying a mold release wax to the frictional pattern, buffing the mold release wax and applying a release agent to the mold release wax surface.

3. The method as set forth in claim 2 wherein the step of forcing the fabric into said second liquid silicone rubber compound includes applying a polyester film with a soft pad.

4. The method as set forth in claim 3 wherein the polyester film is stripped off prior to smoothing off the surface of said second liquid silicone rubber compound.

5. The method as set forth in claim 1 wherein a thickness shim is added to the mold prior to adding the second layer.

6. A method of constructing a thin (less than 40 mils in thickness), lightweight, flexible, durable composite structure that is functional over a wide range of temperatures in a deep space environment for attachment to glove areas for enhancing frictional characteristics including the steps of:

constructing a mold with a bottom surface arranged in a frictional pattern, applying a release agent to the mold for casting, disposing a first liquid silicone rubber compound which can set at ambient temperatures in the mold to form a first layer of material with a selected uniform thickness of approximately 18 to 20 mils;

permitting the first liquid silicone rubber to set to a gel state, attaching a thickness shim to the mold, disposing a second liquid silicone rubber compound which can set at ambient temperatures over the first liquid silicone rubber compound and forming a second liquid silicone rubber compound to a selected uniform thickness of approximately 18 to 20 mils;

overlaying the second liquid silicone rubber compound with a meta-aramid mesh fabric having a thickness less than the thickness of said second liquid silicone rubber compound;

placing a polyester film over the mesh fabric, applying pressure to the film to force the fabric into said second liquid silicone rubber compound to extrude said second liquid silicone rubber compound through the fabric mesh;

stripping off the polyester film;

smoothing off the surface of said second liquid silicone rubber compound whereby the thickness of the composite structure is between 36 and 40 mils; and curing said first and second silicone rubber compounds prior to stripping the composite structure from the mold.

* * * * *